US011248106B2

(12) United States Patent
Thitsartarn et al.

(10) Patent No.: US 11,248,106 B2
(45) Date of Patent: Feb. 15, 2022

(54) METHOD OF FORMING AN EXFOLIATED OR INTERCALATED FILLER MATERIAL

(71) Applicant: Agency for Science, Technology and Research, Singapore (SG)

(72) Inventors: Warintron Thitsartarn, Singapore (SG); Chaobin He, Singapore (SG); Jayven Chee Chuan Yeo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 367 days.

(21) Appl. No.: 16/499,028

(22) PCT Filed: Mar. 28, 2018

(86) PCT No.: PCT/SG2018/050151
§ 371 (c)(1),
(2) Date: Sep. 27, 2019

(87) PCT Pub. No.: WO2018/182522
PCT Pub. Date: Oct. 4, 2018

(65) Prior Publication Data
US 2021/0108050 A1 Apr. 15, 2021

(30) Foreign Application Priority Data

Mar. 28, 2017 (SG) .............................. 10201702505S

(51) Int. Cl.
| *C01B 33/44* | (2006.01) |
| *C08K 9/06* | (2006.01) |
| *C01B 33/40* | (2006.01) |
| *C08K 3/34* | (2006.01) |
| *C08K 9/02* | (2006.01) |
| *C09C 1/42* | (2006.01) |

(52) U.S. Cl.
CPC .............. *C08K 9/06* (2013.01); *C01B 33/40* (2013.01); *C01B 33/44* (2013.01); *C08K 3/346* (2013.01); *C08K 9/02* (2013.01); *C09C 1/42* (2013.01); *C01P 2004/04* (2013.01)

(58) Field of Classification Search
CPC . C08K 9/06; C08K 9/02; C08K 3/346; C08K 3/34; C08K 9/04; C01B 33/40; C09C 1/42; C09C 3/12; C09C 1/402; C01P 2004/04; C01P 2002/77
USPC ...................................................... 523/209
See application file for complete search history.

(56) References Cited

U.S. PATENT DOCUMENTS

| 6,252,020 | B1 * | 6/2001 | Kuo | .......................... | C08F 2/44 |
| | | | | | 428/327 |
| 7,109,257 | B2 * | 9/2006 | Lorah | ..................... | C01B 33/44 |
| | | | | | 523/216 |
| 7,129,287 | B1 | 10/2006 | Lee et al. | | |
| 7,528,191 | B2 * | 5/2009 | Metzemacher | .......... | C08K 9/04 |
| | | | | | 524/860 |
| 9,267,029 | B2 | 2/2016 | Phonthammachai et al. | | |
| 2005/0215693 | A1 | 9/2005 | Wang et al. | | |
| 2010/0196611 | A1 | 8/2010 | Phonthammachai et al. | | |
| 2011/0189476 | A1 | 8/2011 | Kumaki | | |

FOREIGN PATENT DOCUMENTS

| WO | 2014088515 A1 | 6/2014 |
| WO | 2016111647 A1 | 7/2016 |

OTHER PUBLICATIONS

International Search Report for International Application No. PCT/SG2018/050151 dated Jul. 4, 2018, pp. 1-5.
Written Opinion of the International Searching Authority for International Application No. PCT/SG2018/050151 dated Jul. 4, 2018, pp. 1-5.
Xu et al., "Increasing Surface Area of Silica Nanoparticles With a Rough Surface," ACS Applied Materials & Interfaces, vol. 3. No. 6, 2011, pp. 1865-1872.
Zapata et al., "Silica/Clay Organo-Herostructures to Promote Polyethylene-Clay Nanocomposites by in situ Polymerization," Applied Catalysis A: General, vol. 453, 2013, pp. 142-150.
Chen et al., "Poly(Propylene)/Clay Nanocomposites Prepared by Reactive Compunding with an Epoxy Based Masterbatch," Macromolecular Materials and Engineering, vol. 290, 2005, pp. 1029-1036.

* cited by examiner

*Primary Examiner* — Hannah J Pak
(74) *Attorney, Agent, or Firm* — Winstead PC

(57) ABSTRACT

According to the present disclosure, a method of forming an exfoliated or intercalated filler material is provided, wherein the said method comprises the steps of mixing particles of filler material such as montmorillonite (MMT), mica, layered double hydroxide (LDH), and attapulgite (AT) dispersed in an aqueous medium with cationic acrylate monomers to form modified particles comprising positively charged ions, dispersing the modified particles in organic medium to form a dispersion, contacting said dispersion with an organo-silicate such as tetraethyl orthosilicate (TEOS) and a functionalizing agent comprising an organo-silane such as aminopropyltrimethoxysilane (APTMS), in the presence of a basic catalyst to form a layer of silica on the modified particles. The present disclosure also relates to an exfoliated or intercalated filler material obtained by the said method as well as a method of forming a resin/clay nanocomposite.

20 Claims, 2 Drawing Sheets

Clay

Clay Platelet

In solution

In dried form

US 11,248,106 B2

METHOD OF FORMING AN EXFOLIATED OR INTERCALATED FILLER MATERIAL

CROSS-REFERENCE TO RELATED APPLICATION

This application claims the benefit of priority of Singapore Patent Application No. 10201702505S, filed 28 Mar. 2017, the content of it being hereby incorporated by reference in its entirety for all purposes.

TECHNICAL FIELD

The present disclosure relates to a method of forming an exfoliated or intercalated filler material. The present disclosure also relates to such an exfoliated or intercalated filler material. The present disclosure further relates to a method of forming a nanocomposite.

BACKGROUND

The challenge to form high performance clay or layered-liked filler composites lies in the filler exfoliation and/or intercalation and uniform dispersion of clay nanofillers in the composite.

Clays are typically formed of layered sheets disposed adjacent to each other due to strong ionic interactions between the sheets (FIG. 1a). This renders it difficult to exfoliate and/or intercalate the layered-liked clay filler. Even if the clay sheets are successfully separated when dispersed in a solvent or medium to form a suspension, the sheets tend to re-agglomerate and/or restack (FIG. 1b), for example, after the solvent or medium is removed. Moreover, each of the sheets tends to be a flat plate of a single charge type without any active position to interact with a polymer matrix which the clay fillers may be dispersed in (FIG. 1c).

To address the above, conventional methods to enhance the filler dispersion include (1) to introduce functional groups on both the filler and the matrix, or (2) to add compatibilizers for physical and/or chemical interaction between the resin and filler. The physical interaction, however, is often too weak to transfer load efficiently from the matrix to the filler while the chemical interaction tends to result in stiffness, which reduces the fracture toughness of the interphase between the matrix and filler, and in turn causes material cracking. Re-agglomeration of clay before used is a major concern.

There is thus a need to provide for a solution that ameliorates one or more of the issues as mentioned above. The solution should at least provide for an exfoliated or intercalated filler material that can be used in enhancing the mechanical and/or thermal properties of the composite.

SUMMARY

In one aspect, there is provided for a method of forming an exfoliated or intercalated filler material, comprising:
  mixing a suspension comprising particles of a filler material dispersed in an aqueous medium with cationic acrylate monomers to form modified particles comprising positively charged ions;
  dispersing the modified particles in an organic medium to form a dispersion; and
  contacting the dispersion with an organo-silicate and a functionalizing agent comprising an organo-silane in the presence of a basic liquid catalyst to form a layer of silica on the modified particles, thereby forming the exfoliated or intercalated filler material.

In another aspect, there is provided for an exfoliated or intercalated filler material obtained by a method as disclosed above, wherein the exfoliated or intercalated filler material comprises a layer of silica which is formed in situ.

In another aspect, there is provided for a method of forming a nanocomposite, comprising:
  mixing an exfoliated or intercalated filler material obtained by a method as disclosed above with a resin to form a mixture;
  adding a hardener to the mixture; and
  curing the mixture.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which.

DETAILED DESCRIPTION

Figure 1A:
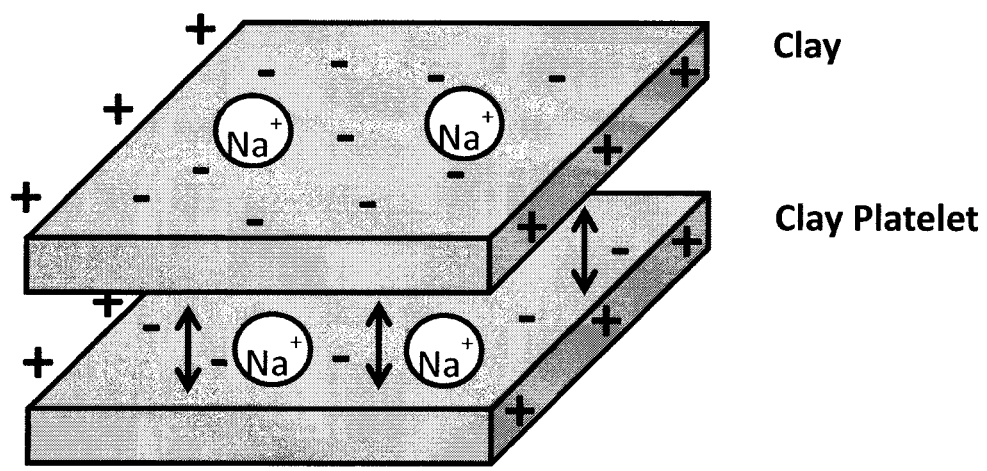
FIG. 1a shows the strong ionic interactions between the sheets of clay, which cause the sheets to stay close to each other, thereby resulting in difficulty of exfoliating or intercalating the layered-liked clay filler.
Figure 1B:
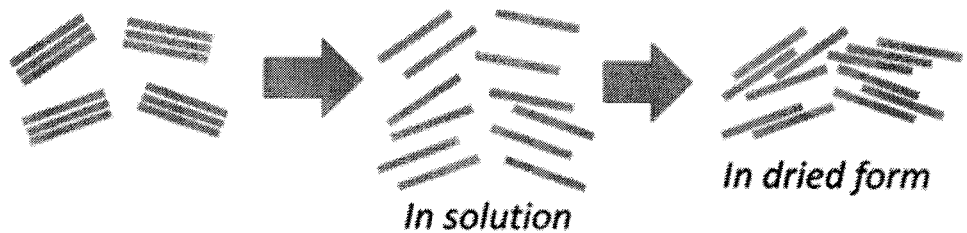
FIG. 1b shows that dispersed clay plates re-agglomerate after the solvent or medium is removed, making it difficult to use conventional clays as layered-liked fillers in dried form.
Figure 1C:
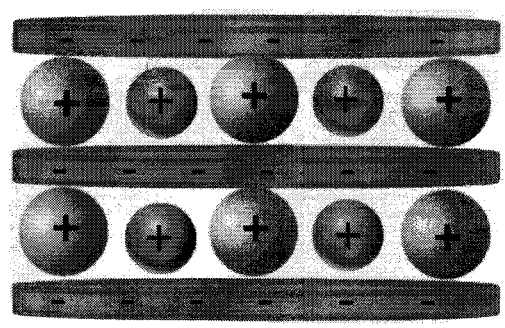
FIG. 1c shows that the flat sheets of clay have a specific type of charge with no active position to form interactions with a polymer matrix in which the sheets of clay, used as layered-liked fillers, are dispersed in. This renders poor compatibility between the clay fillers and the polymer matrix.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure provides for a method to exfoliate and/or intercalate clay. The clay may be used as a filler in forming a composite material. The clay may be formed of layers, and such layers may be called sheets or plates and as such clays may be used as fillers, the present disclosure refers to such clays as layered-liked fillers. Such fillers may also be referred to as filler particles in the present disclosure.

The present method of forming such an exfoliated and/or intercalated clay (i.e. filler material) is an in situ method.

To exfoliate and/or intercalate the clay, the method involves the coating of rough silica layers onto the surface of the clay. That is to say, the surface of each clay plates may be coated with a rough metal oxide layer. In such a method, for example, pristine clay may be subjected to an ion-exchange process, followed by formation of a permanent thin layer of functionalized metal oxide. The metal oxide may be silica. In the context of the present disclosure, the metal oxide (e.g. silica) may be referred to as a functionalized metal oxide in some embodiments, as the surface of the coated metal oxide may be modified and/or functionalized with reactive groups, such as an organo-silane of aminopropyltrimethoxysilane (APTMS).

The present method can permanently exfoliate or intercalate the filler material (e.g. layered-liked nanoparticle) by utilizing the formation of a thin functionalizing metal oxide layer. This thin layer coated on each of the layered clay silicate sheets helps in the exfoliation and/or intercalation of the silicate sheets. They may prevent restacking of the sheets back to their original position or re-agglomeration, for example, when the sheets are dried. With such an exfoliated and/or intercalated clay filler, the polymer resin or matrix which the filler is mixed with can then penetrate and surround the clay sheets to a greater extent. This then allows for better interaction between the polymer resin or matrix to form a composite with better mechanical and/or thermal properties.

In addition, the rough surface of the thin metal oxide layer on the silicate sheets advantageously enhances adhesion between the filler material and the resin matrix in which the filler material is dispersed, due to a mechanism of covalent bonding between the functional groups of the filler and resin, and a lock-and-key mechanism through the rough surface of the metal oxide coated filler. The lock-and-key mechanism may be described, by way of a non-limiting example, as follows. The surface of the filler may act as the lock and the resin may then complement as a key. Due to the rough surface of the filler after formation of the metal oxide (e.g. silica), the resin matrix may infuse into any gaps in the rough surface and this creates a "lock-and-key" interaction with the filler, thereby enhancing interactions between the filler surface and the resin matrix.

The filler material is advantageously versatile and stable as it may be used in its solution form or as a solid powder without re-agglomeration of the clay platelets for at least six months.

Advantageously, addition of the resultant filler into a polymer resin or matrix enhances the mechanical and/or thermal properties of both thermoplastics and thermosetting polymers. This demonstrates that the resultant filler from the present method compatibly improves the mechanical and/or thermal properties of not just one, but more than one type of polymer resin or matrix.

Embodiments described in the context of the present method of forming the exfoliated or intercalated filler material are analogously valid for the present exfoliated or intercalated filler material and its uses as described herein, and vice versa.

Before going into the details of the various embodiments, the definitions of certain terms, expressions or phrases are first discussed.

In the context of the present disclosure, the term "clay" refers to a phyllosilicate of natural and/or synthetic origin having an appropriate structure for exfoliation and/or intercalation. Such clay may have a layered or sheet structure.

In the context of the present disclosure, the term "exfoliated" or its grammatical variant, refers to a layered material (e.g. clay) that has added spacing between its layers due to disposition of substances between the layers. The layers do not exhibit readily perceptible organization, regularity, or orientation.

In the context of the present disclosure, the term "intercalated" or its grammatical variant, refers to a layered material (e.g. clay) that has added spacing between its layers due to disposition of substances between the layers. The layers maintain a perceptible level of organization, regularity, or orientation. In some instances, an intercalated clay may include clays that have complete separation of its clay layers.

In the context of the present disclosure, the terms "organo-silane" and "organo-silicate" refer to a silane compound and a silicate compound, that contain at least one carbon to silicon bond, respectively.

In the context of the present disclosure, the term "alkyl" as a group or part of a group refers to a straight or branched aliphatic hydrocarbon group, including but not limited to, a $C_1$-$C_{12}$ alkyl, a $C_1$-$C_{10}$ alkyl, a $C_1$-$C_6$ alkyl. Examples of suitable straight and branched $C_1$-$C_6$ alkyl substituents include methyl, ethyl, n-propyl, 2-propyl, n-butyl, sec-butyl, t-butyl, hexyl, and the like.

In the context of the present disclosure, the term "alkoxy" as used herein refers to an —O-(alkyl) group, wherein alkyl is defined above. Examples include methoxy, ethoxy, n-propoxy, isopropoxy, tert-butoxy, and the like.

In the context of the present disclosure, the term "amine" as used herein refers to groups of the form —$NR_aR_b$, wherein $R_a$ and $R_b$ may be individually selected from the group including but not limited to hydrogen and optionally substituted alkyl. The definition of alkyl has been provided above. The nitrogen atom may bear a lone pair of electrons.

In the context of the present disclosure, the phrase "optionally substituted" as used herein means the chemical group or functional group to which this phrase refers to may be unsubstituted or may be substituted.

In the context of the present disclosure, the term "alkylamine" refers to an amine containing one or more alkyl groups as defined above. In other words, one or both of $R_a$ and $R_b$, as defined above for the term "amine", excludes hydrogen.

In the context of the present disclosure, the expression "alcohol group" refers to a terminal —OH group.

In the context of the present disclosure, the expression "ketone group" refers to an organic compound with the structure RC(=O)R', wherein R and R' are carbon-containing substituents.

In the context of the present disclosure, the term "suspension" refers to a liquid mixture that contains solid particles observable by the naked eye.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Having defined the various terms, expressions and phrases, the various embodiments are now described below.

In the present disclosure, there is provided for a method of forming an exfoliated or intercalated filler material, comprising: mixing a suspension comprising particles of a filler material dispersed in an aqueous medium with cationic acrylate monomers to form modified particles comprising positively charged ions, dispersing the modified particles in an organic medium to form a dispersion, and contacting the dispersion with an organo-silicate and a functionalizing agent comprising an organo-silane in the presence of a basic liquid catalyst to form a layer of silica on the modified particles, thereby forming the exfoliated or intercalated filler material.

The particles of the filler material as used herein refer to the plates or sheets of the filler material. For instance, the clay particles refer to the clay plates or sheets.

In various embodiments, the filler material to be exfoliated or intercalated may comprise montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered double hydroxide (LDH) or attapulgite (AT).

The filler material may be dispersed in an aqueous medium to form a suspension (e.g. clay suspension). The aqueous medium may already contain the cationic acrylate monomers or the cationic acrylate monomers may be added after the filler material is dispersed in the aqueous medium. The dispersion of the filler material in an aqueous medium enhances the clay exfoliation and/or intercalation, and prepare the surface of the filler for metal oxide (e.g. silica) formation. The acrylate monomers are referred to as "cationic acrylate monomers" or "cation exchange acrylate monomers" because they are used to impart positive charges to the surface of the clay sheets. Such acrylate monomers may act as surfactants that enhance clay exfoliation and/or intercalation by replacing sodium ions in the filler. Such acrylate monomers also help to form the interaction with a resin matrix.

In various embodiments, the cationic acrylate monomers may comprise 2-aminoethyl methacrylate hydrochloride, N-(3-Aminopropyl)methacrylamide hydrochloride, (2-Boc-amino)ethyl methacrylate, methyl 3-(3-amino-5-methoxy-pyridin4-yl)acrylate, 3-(trimethoxysilyl)propyl acrylate, 2-[[(butylamino)carbonyl]oxy]ethyl acrylate, ethyl 3-(2-amino-5-bromo-3-pyridyl)acrylate, [2-(acryloyloxy)ethyl] trimethylammonium chloride and/or methyl 2-[(5-chloro-2-nitrophenoxy)methyl]acrylate.

In various embodiments, the amount of cationic acrylate monomers present in the suspension may be 2 to 30 wt % of the particles of the filler material. In other words, the suspension may contain 2 to 30 wt % of the cationic acrylate monomers, wherein the wt % is based on weight of the particles of the filler material. In various embodiments, the cationic acrylate monomers added may be 2 to 30 wt %, 5 to 30 wt %, 10 to 30 wt %, 15 to 30 wt %, 20 to 30 wt %, 25 to 30 wt %, 2 to 25 wt %, 5 to 25 wt %, 10 to 25 wt %, 15 to 25 wt %, 20 to 25 wt %, 2 to 20 wt %, 5 to 20 wt %, 10 to 20 wt %, 15 to 20 wt %, 2 to 15 wt %, 5 to 15 wt %, 10 to 15 wt %, 2 to 10 wt %, 5 to 10 wt %, 2 to 5 wt %, etc., wherein the wt % is based on weight of the particles of the filler material. In some embodiments, the cationic acrylate monomers used may be 4 wt % of the weight of the particles of the filler material.

In various embodiments, the aqueous medium may comprise deionized water or purified water.

The suspension containing the filler material and the cationic acrylate monomers may be mixed. The mixing may occur at 20 to 90° C., 30 to 90° C., 40 to 90° C., 50 to 90° C., 60 to 90° C., 70 to 90° C., 80 to 90° C., 20 to 80° C., 30 to 80° C., 40 to 80° C., 50 to 80° C., 60 to 80° C., 70 to 80° C., 20 to 70° C., 30 to 70° C., 40 to 70° C., 50 to 70° C., 60 to 70° C., 20 to 60° C., 30 to 60° C., 40 to 60° C., 50 to 60° C., 20 to 50° C., 30 to 50° C., 40 to 50° C., 20 to 40° C., 30 to 40° C., 20 to 30° C., etc. In some embodiments, the mixing may be carried out at 80° C. These temperature ranges may assist the cationic acrylate monomers to interact on and with the clay surface.

In various embodiments, the mixing of the filler material and the cationic acrylate monomers in the suspension may occur for 30 minutes to 24 hours, 1 hour to 24 hours, 5 hours to 24 hours, 10 hours to 24 hours, 15 hours to 24 hours, 20 hours to 24 hours, 30 minutes to 20 hours, 1 hour to 20 hours, 5 hours to 20 hours, 10 hours to 20 hours, 15 hours to 20 hours, 30 minutes to 15 hours, 1 hour to 15 hours, 5 hours to 15 hours, 10 hours to 15 hours, 30 minutes to 10 hours, 1 hour to 10 hours, 5 hours to 10 hours, 30 minutes to 5 hours, 1 hour to 5 hours, 30 minutes to 1 hour, etc. In some embodiments, the mixing duration may be 1 hour. In some embodiments, the mixing duration may be 1 hour to 3 hours.

In some embodiments, the mixing may occur at 80° C. for 1 hour. In various embodiments, the mixing may occur under vigorous stirring. In embodiments where stirring is utilized, the stirring speed may not be less than 500 rpm (rotation per minute). The stirring provides for homogeneous mixing.

After mixing the particles of the filler material with the cationic acrylate monomers to impart positive charges onto the surface of the particles of the filler material, such modified particles may be dispersed into an organic medium to form a dispersion. Dispersion of the modified particles in the organic medium helps to maintain the separation of the clay layers in the filler materials and provides convenience for subsequent use, for example, in fabricating a polymeric clay composite.

In various embodiments, the organic medium may comprise a ketone group, an alcohol group or a hydrocarbon. For embodiments where the organic medium comprises a ketone group, the organic medium may comprise or may be acetone, methyl ethyl ketone, methyl isobutyl ketone and/or cyclohexanone. In some embodiments, the organic medium may comprise or may be acetone. For embodiments where the organic medium comprises an alcohol group, the organic medium may comprise or may be a glycol, for example, ethylene glycol, propylene glycol and/or butylene glycol. In various embodiments where the organic medium comprises an alcohol group, the organic medium may comprise or may be methanol, ethanol, propanol, n-butanol, i-butanol, sec-butanol, tert-butanol, ethylene glycol, propylene glycol and/or butylene glycol. For embodiments where the organic medium comprises a hydrocarbon, the organic medium may comprise or may be hexane, heptane, octane, benzene, toluene and/or xylene. The organic medium to be used may depend on the subsequent uses of the filler material, e.g. forming a polymeric clay composite.

The dispersion, containing the modified particles, may then be contacted with an organo-silicate and a functionalizing agent comprising an organo-silane in the presence of a base. The organo-silicate and the functionalizing agent may be added to the dispersion at the same time, followed by the base, in some embodiments.

In various embodiments, the organo-silicate may have a formula of $SiX_4$, wherein X may be $C_{1-6}$ alkoxy. In various embodiments, the organo-silicate may comprise tetraethyl orthosilicate, tetramethyl orthosilicate, tetrapropyl orthosilicate, tetrabutyl orthosilicate, and/or tetrapentyl orthosilicate. The use of these organo-silicates to assist in the formation of silica makes the reaction of forming a silica layer straightforward and flexible.

In various embodiments, the organo-silicate contacted with the dispersion may be 10 to 100 wt % based on the weight of the modified particles. In other words, 10 to 100 wt % of the organo-silicate may be added to the dispersion, wherein the wt % is based on weight of the modified particles. The organo-silicate added may be 10 to 100 wt %, 20 to 100 wt %, 30 to 100 wt %, 40 to 100 wt %, 50 to 100 wt %, 60 to 100 wt %, 70 to 100 wt %, 80 to 100 wt %, 90 to 100 wt %, 10 to 90 wt %, 20 to 90 wt %, 30 to 90 wt %, 40 to 90 wt %, 50 to 90 wt %, 60 to 90 wt %, 70 to 90 wt %, 80 to 90 wt %, 10 to 80 wt %, 20 to 80 wt %, 30 to 80 wt %, 40 to 80 wt %, 50 to 80 wt %, 60 to 80 wt %, 70 to 80 wt %, 10 to 70 wt %, 20 to 70 wt %, 30 to 70 wt %, 40 to 70 wt %, 50 to 70 wt %, 60 to 70 wt %, 10 to 60 wt %, 20 to 60 wt %, 30 to 60 wt %, 40 to 60 wt %, 50 to 60 wt %, 10 to 50 wt %, 20 to 50 wt %, 30 to 50 wt %, 40 to 50 wt %, 10 to 40 wt %, 20 to 40 wt %, 30 to 40 wt %, 10 to 30 wt %, 20 to 30 wt %, 10 to 20 wt %, etc., wherein the wt % is based on weight of the modified particles.

The organo-silane may be contacted to impart functional groups onto the surface of the modified particles. As mentioned above, such functional groups may provide for forming covalent bonds with polymer resins or matrix which the resultant filler material may be dispersed in.

In various embodiment, the organo-silane may be represented by the formula $(Y\text{---}R)_nSiX_m$, wherein R is $C_{3-6}$ alkyl, X is $C_{1-6}$ alkoxy, Y is a chemical moiety capable of forming covalent bonds with a resin or polymer matrix, and sum of n and m is 4. The "---" in "Y—R" may represent a bond. in In some embodiments, Y may be or may comprise an amine. Advantageously, the amine helps with the formation of strong interaction between the filler and the resin or polymer matrix.

In various embodiments, the organo-silane may be or may comprise β-(3,4-epoxycyclohexyl)ethyltrimethoxysilane, γ-glycidoxypropyltrimethoxysilane, 3-glycidoxypropylmethyldimethoxysilane, γ-mercaptopropyltrimethoxysilane, aminopropyltrimethoxysilane, γ-aminopropylmethyldimethoxysilane, γ-aminopropyltriethoxysilane, γ-aminopropylmethyldiethoxysilane, dimethyl)aminopropyltrimethoxysilane, γ-(N,N-diethyl)aminopropyltrimethoxysilane, γ-(N,N-dibutyl)aminopropyltrimethoxysilane, (methyl) aminopropyltrimethoxysilane, γ-(N-ethyl) aminopropyltrimethoxysilane, γ-(N,N-dimethyl) aminopropyltriethoxysilane, γ-(N,N-diethyl) aminopropyltriethoxysilane, γ-(N,N-dibutyl) aminopropyltriethoxysilane, γ-(N-methyl) aminopropyltriethoxysilane, γ-(N-ethyl) aminopropyltriethoxysilane, γ-(N,N-dimethyl) aminopropylmethyldimethoxysilane, γ-(N,N-diethyl) aminopropylmethyldimethoxysilane, γ-(N,N-dibutyl) aminopropylmethyldimethoxysilane, methyl) aminopropylmethyldimethoxysilane, γ-(N-ethyl) aminopropylmethyldimethoxysilane, N-(trimethoxysilylpropyl)ethylenediamine, N-(dimethoxymethylsilylisopropyl)ethylenediamine, and/or γ-mercaptopropylmethyldimethoxysilane. In some embodiments, the organo-silane may be or may comprise aminopropyltrimethoxysilane (APTMS).

In various embodiments, the amount of organo-silane used may be 10 to 30 wt % of the organo-silicate. In other words, 10 to 30 wt % of the organo-silane may be added to the dispersion, wherein the wt % is based on weight of the organo-silicate. In some embodiments, the amount of organo-silane may be 10 to 30 wt %, 10 to 20 wt %, 20 to 30 wt %, etc., based on weight of the organo-silicate.

As mentioned above, the modified particles in the dispersion may be contacted with the organo-silicate and organo-silane in the presence of a base. The base may be a basic liquid catalyst. In various embodiments, the basic liquid catalyst may comprise ammonia, ammonium hydroxide or alkylamine. The alkylamine may include, without being limited to, methylamine and ethylamine. Advantageously, the base serves as the catalyst for sol-gel reaction of organo-silicate and silane compounds.

In various embodiments, the basic liquid catalyst may be present in an amount which is 20 to 65 wt % of the organo-silicate. In other words, 20 to 65 wt % of the basic liquid catalyst may be added to the dispersion, wherein the wt % is based on weight of the organo-silicate. In various embodiments, the basic liquid catalyst used may be 20 to 65 wt %, 30 to 65 wt %, 40 to 65 wt %, 50 to 65 wt %, 60 to 65 wt %, 20 to 60 wt %, 30 to 60 wt %, 40 to 60 wt %, 50 to 60 wt %, 20 to 50 wt %, 30 to 50 wt %, 40 to 50 wt %, 20 to 40 wt %, 30 to 40 wt %, 20 to 30 wt %, etc., wherein the wt % is based on the weight of the organo-silicate.

In various embodiments, contacting the dispersion with the organo-silicate and the organo-silane in the presence of the basic liquid catalyst may occur at a temperature range of 20 to 60° C. In various embodiments, the contacting of the dispersion with the organo-silicate and the organo-silane also may occur at a temperature range of 20 to 60° C., 30 to 60° C., 40 to 60° C., 50 to 60° C., 20 to 50° C., 30 to 50° C., 40 to 50° C., 20 to 40° C., 30 to 40° C., 20 to 30° C., etc.

In various embodiments, the contacting may occur for a duration of 1 to 24 hours, 5 to 24 hours, 10 to 24 hours, 15 to 24 hours, 20 to 24 hours, 1 to 20 hours, 5 to 20 hours, 10 to 20 hours, 15 to 20 hours, 1 to 15 hours, 5 to 15 hours, 10 to 15 hours, 1 to 10 hours, 5 to 10 hours, 1 to 5 hours, etc. In some embodiments, the contacting of the dispersion with the organo-silicate and the organo-silane in the presence of the basic liquid catalyst may occur for 5 to 24 hours.

In various embodiments, the contacting may occur under vigorous stirring. In some embodiments, the stirring speed may be more than 1000 rpm. The stirring provides for homogeneous mixing.

The present method may further comprise removing the organic medium and excess basic liquid catalyst under vacuum. The excess basic liquid catalyst is removed to avoid further reaction, and to avoid any unwanted effects on the resultant filler material and a resultant composite derived with the filler material. The removal may be carried out at 60° C. under a vacuum pressure as low as 0.001 mbar (0.1 Pa).

The present method may further comprise drying the exfoliated or intercalated filler material. The dried form of the filler provides convenience for subsequent compounding with thermoplastics and for use in generating a liquid form for producing an epoxy filler system.

The present method may further comprise storing the exfoliated or intercalated filler material in a liquid form or in powder form.

The present disclosure also provides for an exfoliated or intercalated filler material obtained by a method as described above.

Various embodiments of the present method, and advantages associated with various embodiments of the present method, as described above, may be applicable to the present exfoliated or intercalated filler material, and vice versa.

In various embodiments, the exfoliated or intercalated filler material may comprise a layer of silica which is formed in situ. As mentioned above, the layer of silica helps to (i) permanently exfoliate or intercalate the layered-liked fillers, (ii) prevent restacking or re-agglomeration of the filler particles, e.g. when dried, (iii) increase aspect ratio of the filler material and (iv) enhance the interaction between the filler material and the polymer resin.

The present disclosure further provides for a method of forming a nanocomposite, comprising: mixing an exfoliated or intercalated filler material obtained by a method as described above with a resin to form a mixture, adding a hardener to the mixture, and curing the mixture.

Various embodiments of the present method and exfoliated or intercalated filler material, and advantages associated with various embodiments of the present method and exfoliated or intercalated filler material, as described above, may be applicable to the present method of forming the nanocomposite, and vice versa.

The term "nanocomposite" may be used interchangeably with the term "composite" in the present disclosure.

This method of forming the nanocomposite is one example of an application of the earlier described method of forming the exfoliated or intercalated filler material and the exfoliated or intercalated filler material.

In various embodiments, the resin may comprise or may be a thermoplastic or a plastic thermoset. The thermoplastic may comprise or may be propylene, polyethylene, acrylonitrile butadiene styrene, polyamide, poly(methyl methacrylate), polycarbonate, polylactide, polystyrene, and polyvinyl chloride. The plastic thermoset may be an epoxy, including but not limited to, bisphenol A type epoxy, bisphenol S type epoxy, bisphenol K type epoxy, bisphenol F type epoxy, phenolic novolak type epoxy, cresol novolak type epoxy, alicyclic epoxy, heterocyclic epoxy, hydrogenated bisphenol A type epoxy and aliphatic epoxy. Heterocyclic epoxy may include triglycidyl isocyanuric, hydantoin epoxy, etc. Aliphatic epoxy may include glycol-diglycidyl ether, pentaerythritolpolyglycidyl ether, etc.

In various embodiments, the hardener may comprise aliphatic or aromatic diamines, such as Ethacure 100LC, and/or aliphatic or aromatic poly-functional amines.

In various embodiments, the curing may occur at, for example, 100 to 250° C. The curing duration may be, for example, 1 hour to 4 hours. The curing conditions, such as temperature and duration, may depend on, for example, the resin and/or hardener used.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to a method of forming an exfoliated or intercalated filler material. The present disclosure also relates to an exfoliated or intercalated filler material obtained by such a method. The present disclosure further relates to a method of forming a nanocomposite, which utilizes the earlier described present method and the present exfoliated or intercalated filler material.

The present method of forming an exfoliated or intercalated filler material is capable of providing for permanent exfoliation or intercalation of, for example, a silicate filler, via in situ formation of functionalized rough thin metal oxide layer on the filler surface. The thin layer of metal oxide can interact with the polymer matrix via a lock-and-key mechanism and a chemical bond, e.g. covalent bond, which provide for mechanical property enhancement.

In the present disclosure, the terms "filler", "filler material", "filler particle", "filler nanoparticle" and "nanofiller" are used interchangeably.

The present method of forming the exfoliated or intercalated filler material, the present exfoliated or intercalated filler material, and the present method of forming the nanocomposite, and their applications, are described, by way of non-limiting examples, as set forth below.

Example 1: General Synthesis of Present Exfoliated or Intercalated Filler Material In general, the present method of forming the present exfoliated or intercalated filler material includes two steps, which are (a) in situ ion exchange and (b) in situ $SiO_2$ formation. The method is applicable with layered-liked particles such as montmorillonite (MMT), mica, layered double hydroxide (LDH), and attapulgite (AT), etc.

For step (a), an ion exchanger having cationic acrylate monomers for exchange was used. The amount used may include, without being limited to, 4 wt % of the layered-liked particles (i.e. filler). The filler particles was dispersed in a aqueous medium, such as deionized water, and stirred with the acrylate monomers. The stirring may be carried out, for example, at 80° C. and for 1 hour, under vigorous stirring. Subsequently, the water was removed and the wet slurry product was re-dispersed in an organic medium. The organic medium may comprise of an organic compound containing a ketone functional group (e.g. acetone), an alcohol group (e.g. ethanol, methanol, i-propanol) or a hydrocarbon (e.g. hexane, toluene).

Proceeding on to step (b), the slurry product dispersed in the organic medium was contacted with a silica precursor. The silica precursor may be an organo-silicate compound having the formula SiX$_4$, where X is a C$_{1-6}$-alkoxy group. In various embodiments, the organo-silicate used was tetraethyl orthosilicate (TEOS). The amount was varied from 10 to 100 wt % of the slurry product from step (a).

The slurry product was also contacted with a functionalizing agent. The functionalizing agent may contain at least one organo-silane coupling agent having the formula (Y—R)$_n$SiX$_m$, where Y is a chemical moiety capable of chemically reacting with one or more functional groups of a polymer forming the resin or matrix in which the filler material was to be dispersed in, R is a C$_{3-6}$-alkyl group, X is a C$_{1-6}$-alkoxy group, and n and m are any integers such that they summed up to 4 (n+m=4). Y may be an amine group. In various embodiments, the organo-silane coupling agent used was aminopropyltrimethoxysilane (APTMS) and the amount used was varied from 10 to 30 wt % of the silica precursor (i.e. organo-silicate). A basic liquid catalyst, such as ammonium hydroxide, was also used. The amount of the catalyst used was varied from 20 to 65 wt % of the silica precursor. Step (b) was conducted under vigorous stirring, and the reaction temperature was varied from ambient temperature until 60° C. The reaction duration is varied from 1 hour to 24 hours.

After step (b), the organic medium and any residual or excess basic liquid catalyst are removed under a vacuum system. The solid product after the organic medium removal was kept in two forms: a solution form and a solid powder form.

The solid product can be used as a mechanical enhancing filler in thermoplastics and plastic thermosets.

Example 2a: Filler Synthesis Method—Ion Exchange Step 5 g of pristine clay was dispersed in 100 mL of deionized water in the presence of 200 mg of 2-aminoethyl methacrylate hydrochloride and stirred at 80° C. for 1 hour. The gel-like suspension was centrifuged at 9000 rpm for 1 hour to separate water from modified clay which was re-dispersed in 50 mL of acetone for later use.

Example 2b: Filler Synthesis Method—In Situ Formation of Functionalized Silica Layer The modified clay dispersed in acetone from example 2a was vigorously stirred at 50° C. (3-aminopropyl)-trimethoxysilane (APTMS) and tetraethyl orthosilicate (TEOS) were added into the stirred solution, followed by addition of concentrated ammonium hydroxide (NH$_4$OH). The weight ratio of clay:APTMS:TEOS:NH$_4$OH was 1:0.2:1:0.62. The weight ratio between solid clay and TEOS could be varied from 1:0.1 to 1:1. The mixture was vigorously stirred for 1 hour. Then, the solvent or medium and excess catalyst was removed under vacuum system. The wet product was further dried using rotary evaporator, and dried overnight in oven at 80° C. The resultant filler product was kept in two forms: (1) in acetone solution and (2) in powder form, where each of them was for preparation of a thermoset nanocomposite and a thermoplastic nanocomposite, respectively. The filler products were designated CS.

Example 3: Nanocomposite Preparation

For the thermoset nanocomposite, epoxy was used to form an epoxy/clay nanocomposite. The filler product in acetone solution from example 2b was mixed with epoxy resin (D.E.R. 332) at various filler contents. The mixture was homogenized for 15 minutes. After that, the hardener (Ethacure 100LC) was added into the resin mixture. The resin was degassed at 75° C. until no bubble observed. Then, the resin mixture was poured into various glass molds, cured at 130° C. for 1 hour, 160° C. for 2 hours and 230° C. for 4 hours.

For the thermoplastic nanocomposite, polypropylene was used to form a polypropylene/clay nanocomposite: The filler product in powder form from example 2b was directly mixed with a polypropylene (PP 640J), at various filler contents. The compound pellet was kept for further test characterization.

Example 4: Characterization of Newly-Developed Filler Incorporated Epoxy Nanocomposite The following characterizations were carried out.

High resolution transmission electron microscopy (HR-TEM) micrographs were taken with a Philips CM300 at 300 kV. The samples with a thickness of approximately 100 nm were microtomed at room temperature using a diamond knife and collected on 200 mesh copper grids.

Field emission scanning electron microscope (FESEM) micrographs were taken using FESEM, JEOL-6700F, conducted in high resolution mode with a large objective aperture at 200 kV.

For dynamic mechanical analysis, the storage modulus and glass transition temperature (T$_g$) of the nanocomposite were measured with a dynamic mechanical analyzer (DMA Q800, TA Instruments) using single cantilever mode. The geometry of the specimens is 35 mm (length)×12.7 mm (width)×2.5 mm (thickness). Scans were conducted in a temperature range of 30° C. to 250° C. at a heating rate of 3° C./min, frequency of 1 Hz and oscillation amplitude of 20 µm.

For mechanical property, the flexural modulus was determined by 3-point bending test based on ASTM Standard D 790-96. The composite was cut to specimen size of 55 mm×12.7 mm×2.5 mm. The tests were conducted with crosshead speed of 1 mm/min, at a span length of 40 mm. The sample was cut to dog-bone shape for tensile modulus test, according to ASTM D 638-03. The dimension was 55 mm×3.2 to 3.5 mm×2.5 mm. The test was carried using the Instron 5569 Table Universal testing machine at tensile speed of 1 mm/min.

Example 5: Comparative Examples

Four comparative examples of clay nanocomposites were produced for experimental comparison with the present nanocomposite formed based on the method of the present disclosure.

Comparative example 1 (CE1) was an epoxy/clay nanocomposite using clay prepared as disclosed in US 2010/0196611.

Comparative example 2 (CE2) was an epoxy/silica nanocomposite using silica prepared as disclosed in U.S. Pat. No. 9,267,029.

Comparative example 3 (CE3) was a polypropylene/clay nanocomposite using a clay masterbatch prepared as disclosed in Macromolecular Materials and Engineering, vol. 290, pp. 1029-1036, 2005.

Comparative example 4 (CE4) was a polypropylene/silica nanocomposite using silica masterbatch prepared as disclosed in WO 2014/088515.

Example 6a: Experimental Results of the Epoxy Nanocomposite

Table 1 below shows the mechanical and thermal properties of the present epoxy nanocomposite with filler prepared from example 2b, compared to those of CE1 and CE2. The filler content for all epoxy/clay nanocomposites in table 1 is 1 wt %, wherein the wt % is based on the nanocomposite. Neat epoxy acts as an epoxy nanocomposite control reference (i.e. no fillers used).

TABLE 1

Comparison of Mechanical and Thermal Properties

| Sample | Tensile Modulus (GPa) | Max Tensile Strength (MPa) | Elongation at break (mm/mm) | Storage E (30° C. to 250° C.) | Tg (° C.) | $K_{1c}$ ($MPa \cdot m^{1/2}$) |
|---|---|---|---|---|---|---|
| Neat epoxy | 2.38 ± 0.02 | 48.4 ± 4.19 | 2.7 ± 0.27 | 2.50 ± 0.17 | 203.4 ± 0.18 | 1.25 ± 0.08 |
| 1 wt % CE1 | 2.64 ± 0.09 (↑10%) | 35.6 ± 3.11 (↓26%) | 2.65 ± 0.26 (↓2%) | 2.67 ± 0.21 (↔) | 201.3 ± 0.26 (↔) | 1.65 ± 0.31 (↑24%) |
| 1 wt % CE2 | 2.50 ± 0.23 (↑5%) | 54.3 ± 3.10 (↑12%) | 2.35 ± 0.26 (↓13%) | 2.20 ± 0.22 (↓10%) | 164 ± 1.01 (↓18%) | 0.66 ± 0.10 (↓47%) |
| 1 wt % Clay-SiO$_2$ (CS-1) | 2.48 ± 0.08 (↑4%) | 68.5 ± 3.98 (↑42%) | 4.17 ± 0.60 (↑54%) | 2.31 ± 0.13 (↔) | 204.3 ± 0.47 (↔) | 2.00 ± 0.20 (↑60%) |
| 1 wt % Clay-SiO$_2$ (CS-2) | 2.52 ± 0.05 (↑6%) | 66.2 ± 5.03 (↑38%) | 3.95 ± 0.82 (↑46%) | 2.62 ± 0.11 (↔) | 204.1 ± 0.19 (↔) | 1.44 ± 0.09 (↑15%) |

Note:
CS-1 = clay to TEOS weight ratio of 1:0.5, CS-2 = clay to TEOS weight ratio of 1:1.

The mechanical testing result of the present epoxy nanocomposite in table 1 obviously demonstrated that addition of the presently developed CS nanofiller significantly improved both the material's strength (evaluated via the tensile property) and toughness (evaluated via the $K_{1c}$). The improvement of the nanocomposite's strength and toughness is due to two possible mechanisms.

Figure 2:
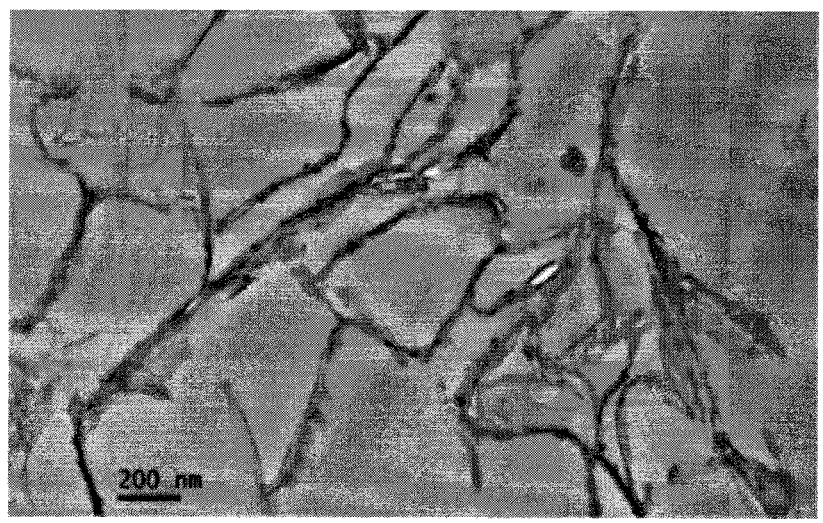
FIG. 2 shows a high resolution transmission electron microscopy (HRTEM) image of a well exfoliated and/or intercalated clay having a rough surface of silica layer coated thereon, which supports the lock-and-key mechanism as described herein. The scale bar represents 200 nm.
Figure 3:
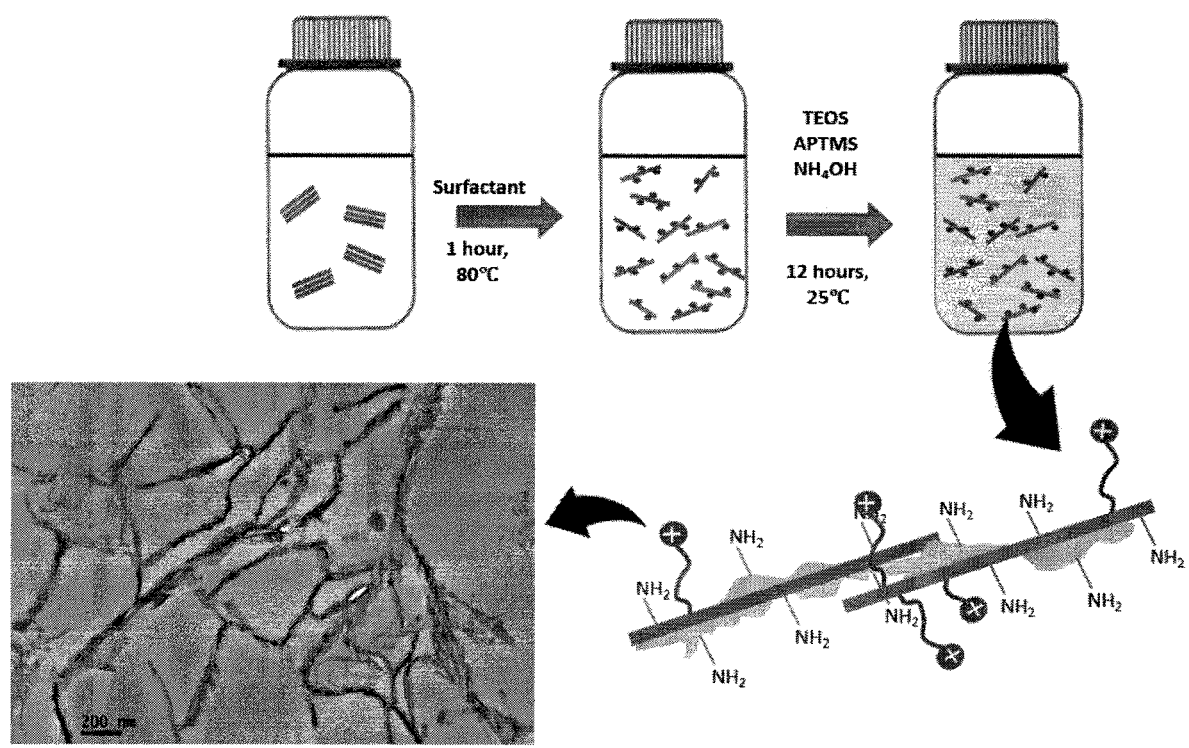
FIG. 3 shows a schematic diagram of the present method of forming an exfoliated or intercalated filler material described according to an embodiment disclosed herein. The resultant filler material has its sheets' surface coated with silica and functionalized with positively charged ions and amine functional groups, both of which may interact with the polymer of a resin the filler is to be dispersed in. The scale bar represents 200 nm.

The first lies in a lock-and-key mechanism. The TEM image in FIG. 2 shows the rough surface of silica layer coated on the clay surface, which is the position at which the resin fuses into the hole, increasing the interaction area of resin and filler. The rough silica surface was possibly produced through co-condensation of APTMS and TEOS.

The second is due to chemical bond between amine functional groups on the silica surface and the epoxy matrix, wherein the amine functional groups are from the APTMS.

The synergism of these two mechanisms leads to the mechanical enhancement of the present epoxy nanocomposite. For comparison purpose, CE1 and CE2 epoxy composites were prepared. It is clear that epoxy nanocomposites with the present hybrid CS filler provides better mechanical performance using the same amount of filler (i.e. 1 wt %). The CE1 and CE2 did not improve multiple properties of their composites. Accordingly, the experiment result suggests that using any typical and/or conventional fillers, even if they were functionalized, may improve one aspect of the epoxy composite's mechanical property but it is unavoidable that other properties become compromised. Meanwhile, the presently developed filler serves as an excellent alternative that can mitigate such an issue, making it superior for use in the advanced material industry.

Example 6b: Experimental Results of the Nanocomposite

Table 2 below shows the mechanical and thermal properties of the present polypropylene nanocomposite with filler prepared from example 2b, compared to those of CE3 and CE4. Samples CS-2, CE3 and CE4 are based on PP and MPP, where MPP denotes maleic anhydride grafted polypropylene. Sample CS-2 incorporates the present filler.

TABLE 2

Comparison of Mechanical and Thermal Properties

| Samples | Tensile Modulus (GPa) | | Max Tensile Strength (MPa) | | Flex Modulus (GPa) | | Flex Strength (MPa) | |
|---|---|---|---|---|---|---|---|---|
| | 5% Filler | 3% Filler | 5% Filler | 3% Filler | 5% Filler | 3% Filler | 5% Filler | 3% Filler |
| PP | 1.32 | | 27.97 | | 2.00 | | 44.47 | |
| PP + MPP | 1.54 | | 28.38 | | 1.98 | | 46.27 | |
| CE3 | 1.70 (↑29%) | 1.54 (↑17%) | 27.59 (↓1%) | 28.55 (↑2%) | 2.03 (↑2%) | 2.13 (↑7%) | 45.88 (↑3%) | 49.63 (↑12%) |
| CE4 | 1.61 (↑22%) | 1.51 (↑14%) | 27.44 (↓2%) | 27.97 (↔) | 2.07 (↑4%) | 2.19 (↑10%) | 47.41 (↑6%) | 47.69 (↑7%) |
| CS-2 | 1.81 (↑37%) | 1.62 (↑23%) | 29.05 (↑4%) | 30.04 (↑7%) | 2.15 (↑8%) | 2.21 (↑11%) | 48.27 (↑9%) | 48.19 (↑8%) |

Note:
the standard deviation is about 3% to 10%, which suggests the homogeneous dispersion of filler in polymer matrix, CS-2 = clay to TEOS weight ratio of 1:1.

The mechanical test for the polypropylene nanocomposite having the new developed hybrid filler demonstrated its superior performance as compared to polypropylene nanocomposites of CE3 and CE4. The result suggests the potential application of the present filler in thermoplastic systems. In addition, the filler can be kept in powder form and filler agglomeration was not observed, which suggests the easy handling of the present filler and its suitability for thermoplastic compounding process.

Example 7: Commercial/Potential Applications

The present method of forming the exfoliated or intercalated filler material is an excellent alternative for applications in future advance composite industry.

The present method, present exfoliated or intercalated filler material, and the present method of forming a nanocomposite, overcome the one or more issues as mentioned above. They improve the filler aspect ratio. With improved filler aspect ratio, more of the surface of each clay sheets may be covered with silica, which means that there is greater interaction between the filler material and the polymer matrix in which the filler material is incorporated, and this helps to improve the mechanical and/or thermal properties of the composite. The present methods of forming the filler material and nanocomposite are convenient over conventional methods and are scalable. The exfoliated or intercalated filler material and composite, formed from the present methods as disclosed herein, provide for enhancing the mechanical (e.g. toughness) and/or thermal properties of both thermoplastics and plastic thermosets. The various embodiments as disclosed herein are practically applicable to various industrial processes.

Potential applications of the present method of forming the exfoliated or intercalated filler material, the exfoliated or intercalated filler material, and the present method of forming the nanocomposite, include without being limited to, structural components used in automotives, building infrastructures, sporting goods and packaging materials.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of forming an exfoliated or intercalated filler material, comprising:
   mixing a suspension comprising particles of a filler material dispersed in an aqueous medium with cationic acrylate monomers to form modified particles comprising positively charged ions;
   dispersing the modified particles in an organic medium to form a dispersion; and
   contacting the dispersion with an organo-silicate and a functionalizing agent comprising an organo-silane in the presence of a basic liquid catalyst to form a layer of silica on the modified particles, thereby forming the exfoliated or intercalated filler material.

2. The method of claim 1, wherein the cationic acrylate monomers comprise 2-aminoethyl methacrylate hydrochloride, N-(3-Aminopropyl)methacrylamide hydrochloride, (2-Boc-amino)ethyl methacrylate, methyl 3-(3-amino-5-methoxypyridin4-yl)acrylate, 3-(trimethoxysilyl)propyl acrylate, 2-[[(butylamino)carbonyl]oxy]ethyl acrylate, ethyl 3-(2-amino-5-bromo-3-pyridyl)acrylate, [2-(acryloyloxy)ethyl] trimethylammonium chloride, or methyl 2-[(5-chloro-2-nitrophenoxy)methyl]acrylate.

3. The method of claim 1, wherein the suspension contains 2 to 30 wt % of the cationic acrylate monomers, wherein the wt % is based on weight of the particles of the filler material.

4. The method of claim 1, wherein the aqueous medium comprises deionized water or purified water.

5. The method of claim 1, wherein the mixing occurs at 20 to 90° C.

6. The method of claim 1, wherein the organic medium comprises a ketone group, an alcohol group, or a hydrocarbon.

7. The method of claim 6, wherein the organic medium comprises acetone, methyl ethyl ketone, methyl isobutyl ketone, or cyclohexanone.

8. The method of claim 6, wherein the organic medium comprises methanol, ethanol, propanol, n-butanol, i-butanol, sec-butanol, tert-butanol, ethylene glycol, propylene glycol, or butylene glycol.

9. The method of claim 6, wherein the organic medium comprises hexane, heptane, octane, benzene, toluene, or xylene.

10. The method of claim 1, wherein the organo-silicate has a formula of $SiX_4$ and X is $C_{1-6}$ alkoxy.

11. The method of claim 1, wherein the organo-silane is represented by the formula $(Y-R)_n SiX_m$, wherein R is $C_{3-6}$ alkyl, X is $C_{1-6}$ alkoxy, Y is a chemical moiety capable of forming covalent bonds with a resin or polymer matrix, and sum of n and m is 4.

12. The method of claim 11, wherein Y comprises an amine.

13. The method of claim 11, wherein the organo-silane comprises β-(3,4-epoxycyclohexyl)ethyltrimethoxysilane, γ-glycidoxypropyltrimethoxysilane, 3-glycidoxypropylmethyldimethoxysilane, γ-mercaptopropyltrimethoxysilane, aminopropyltrimethoxysilane, γ-aminopropylmethyldimethoxysilane, γ-aminopropyltriethoxysilane, γ-aminopropylmethyldiethoxysilane, γ-(N,N-dimethyl)aminopropyltrimethoxysilane, γ-(N,N-diethyl)aminopropyltrimethoxysilane, γ-(N,N-dibutyl)aminopropyltrimethoxysilane, γ-(N-methyl)anilinopropyltrimethoxysilane, γ-(N-ethyl)anilinopropyltrimethoxysilane, γ-(N,N-dimethyl)aminopropyltriethoxysilane, γ-(N,N-diethyl)aminopropyltriethoxysilane, γ-(N,N-dibutyl)aminopropyltriethoxysilane, 7-(N-methyl)aminopropyltriethoxysilane, γ-(N-ethyl)aminopropyltriethoxysilane, γ-(N,N-dimethyl)aminopropylmethyldimethoxysilane, γ-(N,N-diethyl)aminopropylmethyldimethoxysilane, γ-(N,N-dibutyl)aminopropylmethyldimethoxysilane, γ-(N-methyl)aminopropylmethyldimethoxysilane, γ-(N-ethyl)aminopropylmethyldimethoxysilane, N-(trimethoxysilylpropyl)ethylenediamine, N-(dimethoxymethylsilylisopropyl)ethylenediamine, and/or γ-mercaptopropylmethyldimethoxysilane.

14. The method of claim 1, wherein 10 to 30 wt % of the organo-silane is added to the dispersion, wherein the wt % is based on weight of the organo-silicate.

15. The method of claim 1, wherein the basic liquid catalyst comprises ammonia, ammonium hydroxide, or alkylamine.

16. The method of claim 1, wherein 20 to 65 wt % of the basic liquid catalyst is added to the dispersion, wherein the wt % is based on weight of the organo-silicate.

17. The method of claim 1, further comprising removing the organic medium and excess basic liquid catalyst under vacuum.

18. The method of claim 1, further comprising drying the exfoliated or intercalated filler material.

19. An exfoliated or intercalated filler material obtained by a method comprising:
   mixing a suspension comprising particles of a filler material dispersed in an aqueous medium with cationic acrylate monomers to form modified particles comprising positively charged ions;
   dispersing the modified particles in an organic medium to form a dispersion; and
   contacting the dispersion with an organo-silicate and a functionalizing agent comprising an organo-silane in the presence of a basic liquid catalyst to form a layer of silica on the modified particles, thereby forming the exfoliated or intercalated filler material,
   wherein the exfoliated or intercalated filler material comprises the layer of silica which is formed in situ.

20. A method of forming a nanocomposite, comprising:
   mixing a suspension comprising particles of a filler material dispersed in an aqueous medium with cationic acrylate monomers to form modified particles comprising positively charged ions;
   dispersing the modified particles in an organic medium to form a dispersion;

contacting the dispersion with an organo-silicate and a functionalizing agent comprising an organo-silane in the presence of a basic liquid catalyst to form a layer of silica on the modified particles, thereby forming the exfoliated or intercalated filler material;

mixing the exfoliated or intercalated filler material with a resin to form a mixture;

adding a hardener to the mixture; and curing the mixture.

* * * * *